United States Patent
Queen

(10) Patent No.: US 7,195,124 B2
(45) Date of Patent: Mar. 27, 2007

(54) SOCKET TRAY FOR AUTOMATED TORQUING SYSTEM

(76) Inventor: Joseph E. Queen, 220 S. Huron St., Ypsilanti, MI (US) 48197

( * ) Notice: Subject to any disclaimer, the term of this patent is extended or adjusted under 35 U.S.C. 154(b) by 0 days.

(21) Appl. No.: 11/311,849

(22) Filed: Dec. 19, 2005

(65) Prior Publication Data
US 2006/0081547 A1   Apr. 20, 2006

(51) Int. Cl.
*A47F 7/00*   (2006.01)
(52) U.S. Cl. .................................... 211/70.6
(58) Field of Classification Search ............. 211/70.6, 211/69, 69.1, 60.1, 71.01, 85.18
See application file for complete search history.

(56) References Cited

U.S. PATENT DOCUMENTS

| | | | |
|---|---|---|---|
| 4,590,662 A * | 5/1986 | Norota | ........................ 483/64 |
| 5,014,794 A | 5/1991 | Hansson | |
| 5,117,919 A | 6/1992 | Borries et al. | |
| 5,229,931 A | 7/1993 | Takeshima et al. | |
| 5,377,578 A | 1/1995 | Borries | |
| 5,405,025 A | 4/1995 | Melrose | |
| 5,407,063 A | 4/1995 | Warner et al. | |
| 5,465,025 A * | 11/1995 | Hendrickson | .......... 313/318.09 |
| 5,636,750 A * | 6/1997 | Heyl | .......................... 211/1.57 |
| 5,713,250 A | 2/1998 | Hendricks et al. | |
| 6,055,484 A | 4/2000 | Lysaght | |
| 6,390,205 B2 | 5/2002 | Wallgren et al. | |
| 6,845,834 B2 * | 1/2005 | Hatanaka | ..................... 180/167 |

* cited by examiner

*Primary Examiner*—Sarah Purol
(74) *Attorney, Agent, or Firm*—Butzel Long

(57) ABSTRACT

A socket tray for use in torque control systems that includes proximity sensors that detect the presence or absence of sockets normally held in the socket tray without coming into direct contact with the sockets. The sockets are received and held in socket-receiving chambers that can have open or closed bottoms. The proximity sensors are positioned to detect the presence or absence of sockets in the socket-receiving chambers.

13 Claims, 3 Drawing Sheets

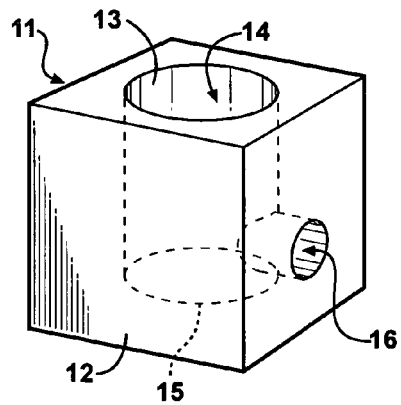
FIG - 2
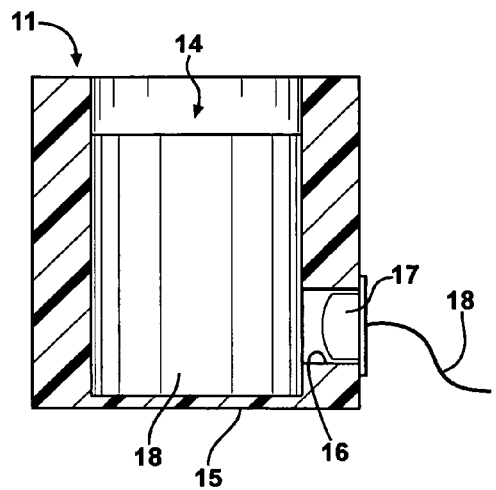
FIG - 4
FIG - 6
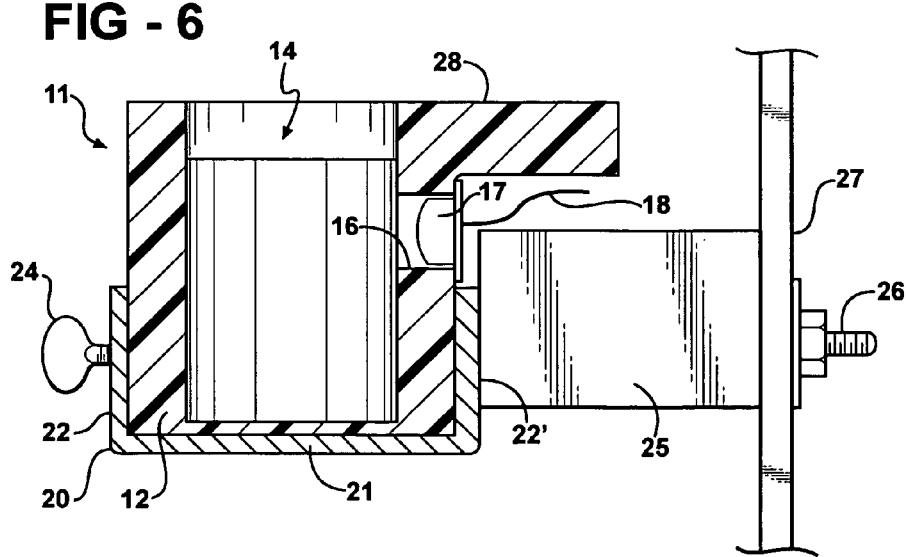

SOCKET TRAY FOR AUTOMATED TORQUING SYSTEM

TECHNICAL FIELD

The present invention relates to torque control systems for controlling the torque applied by power tools to various threaded fasteners. More particularly, the present invention is directed to a socket tray that is equipped with sensors that detect the presence or absence of sockets held in the socket tray.

BACKGROUND ART

The assembly process for various industrial products such as automobiles is becoming more and more automated in order to improve efficiency and quality. While some assembly processes, such as welding, painting, etc. can be fully automated; there remain a number of processes that require a significant amount of operator involvement. In particular, joining two or more parts together with threaded fasteners such as bolts, nuts, screws, etc. often requires an operator to manipulate a hand-held tool to perform the operation.

Air tools are commonly used to apply torque to threaded fasteners when joining two or more parts together. Nut runner air tools, for example, are used to provide relative rotation between a nut and bolt by running the nut along the bolt to form a fastener joint connection. The torque applied is substantially increased under load as the fastener connection approaches completion. In order to apply a specified torque, torque shut off valves have been used in air tools to shut off the air supply to the tool motor when a desired torque specification is achieved.

The critical nature of certain fastener joints requires careful control of when threaded fasteners are tightened. Insufficient torque can result in fastener joints becoming loose and failing. Excessive torque can damage threaded fasteners or create excessive stain that can result in fastener joint failure. Different size threaded fasteners generally have different torque requirements when used to form fastener joints, with the amount of torque typically increasing with the size of the threaded fasteners.

There are a number of torque control systems as exemplified by U.S. Pat. No. 5,713,250 to Hendricks et al., U.S. Pat. No. 5,377,578 to Borries, U.S. Pat. No. 5,177,919 to Borries et al., U.S. Pat. No. 5,229,931 to Takeshima et al., U.S. Pat. No. 5,014,794 to Hansson, U.S. Pat. No. 6,390,205 to Wallgren et al., and U.S. Pat. No. 6,055,484 to Lysaght.

Of these patents, U.S. Pat. No. 5,713,250 to Hendricks et al. discloses a system that includes a socket tray 78 that holds four different size sockets 92 in socket holders 200. At the bottom of each socket holder 200 is a conventional, normally closed, single pole, push button activated switch 202. When a socket 92 is removed from one of the socket holders 200 the associated push button switch sends a signal to the trigger switch box 73 which in turn sends a signal to controller 72 which controls the torque applied by tightening wrench (nut runner) 75.

In addition to U.S. Pat. No. 5,713,250 to Hendricks et al., U.S. Pat. No. 5,405,025 to Melrose discloses a socket tray that includes sensing switches or microswitches 20 that are positioned along the respective socket centerline positions and switch activators 21 that contact sockets when they are disposed within the socket tray.

Even though the use of mechanical contact switches in socket trays is conventional, they generally have a high or frequent failure rate. This is because, in order to operate, the mechanical contact switches have to be contacted with sockets as the sockets are placed in the socket tray. During actual use, operators typically slam the sockets into the socket trays which results in shock and impact damage to the mechanical contact switches and eventual failure.

The present invention provides a socket tray for torque control systems that is designed and configured to avoid the use of mechanical switches that require contact activation and the problems associated therewith.

DISCLOSURE OF THE INVENTION

According to various features, characteristics and embodiments of the present invention which will become apparent as the description thereof proceeds, the present invention provides a socket tray which includes:

a plurality of socket-receiving chambers; and a plurality of proximity sensors, each one of the plurality of proximity sensors being associated with a separate one of the plurality of socket-receiving chambers and positioned so as to sense the presence or absence of a socket positioned within the socket-receiving chambers without being directly contacted by sockets positioned within the socket-receiving chambers.

The present invention further provides a method of controlling the torque applied to a fastener by power tool which involves:

providing a power tool;

providing a controller that, in response to a received signal, controls the amount of torque applied to a fastener by the power tool;

providing a socket tray that holds a plurality of sockets and includes proximity sensors that sense the presence or absence of each of the plurality of held sockets without coming into direct contact with the sockets;

removing one of the plurality of sockets from the socket tray and attaching the socket to the power tool;

detecting the removal or absence of the removed socket by an associated one of the proximity sensors which generates an electric signal; and sending the electrical signal to the controller to control the amount of torque applied to a fastener using the removed socket.

The present invention also provides a system for controlling the torque applied to a fastener by power tool which includes:

a power tool;

a socket tray that holds a plurality of sockets and includes proximity sensors that sense the presence or absence of each of the plurality of held sockets without coming into direct contact with the sockets, the proximity sensors generate an electrical signal upon removal of an associated socket; and a controller that, in response to a received signal from the proximity sensors, controls the amount of torque applied to a fastener by the power tool.

BRIEF DESCRIPTION OF DRAWINGS

The present invention will be described with reference to the attached drawings which are given as non-limiting examples only, in which:

FIG. 2 is a perspective view of a single modular socket holder according to one embodiment of the present invention.

FIG. 4 is a cross sectional view of a socket holder according to one embodiment of the present invention.

FIG. 6 is a cross sectional view of the socket tray of FIG. 5 taken along section lines 6.

BEST MODE FOR CARRYING OUT THE INVENTION

Figure 1:
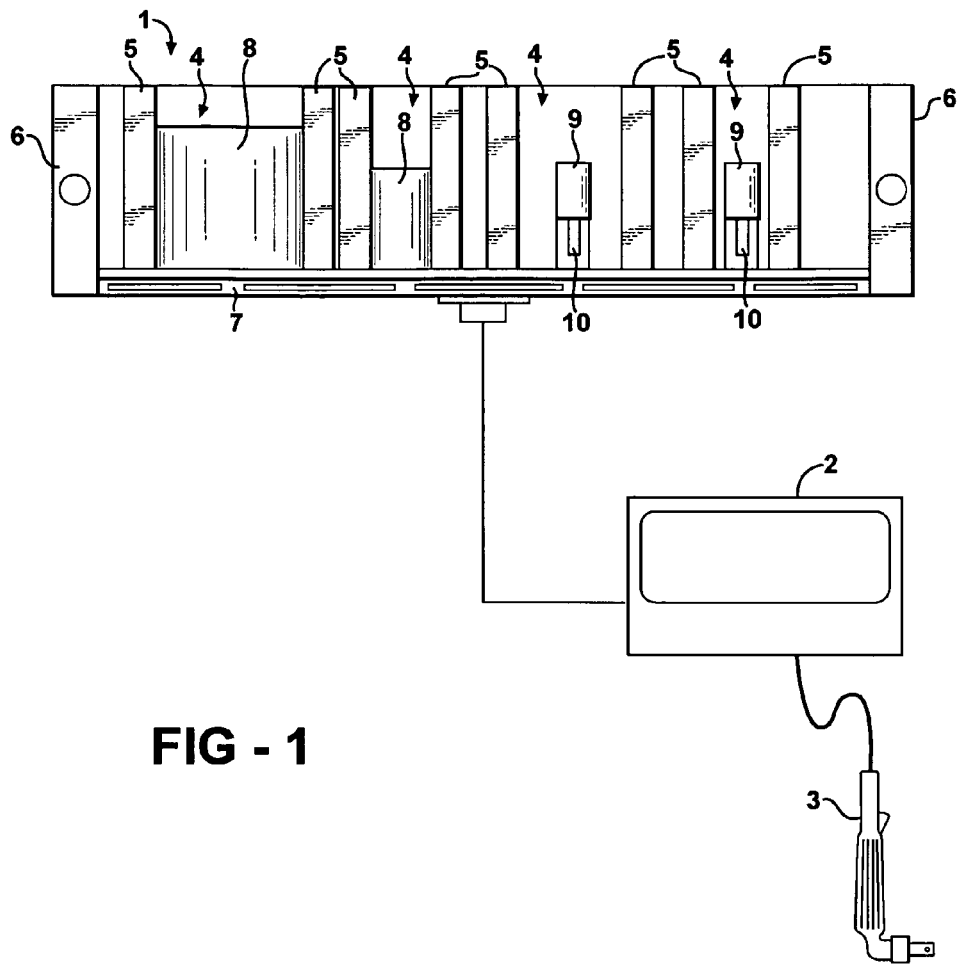
FIG. 1 is a plain view of a conventional socket tray in association with a torque controlling system and a tool.

The present invention is directed to socket trays that are designed and configured to be used in conjunction with torque control systems. The socket trays of the present invention are equipped with proximity sensors that detect the presence or absence of sockets held in the socket tray. The proximity sensors can be optical and operate on reflectance or transmittance detection. In other embodiments the proximity sensors can use any type of electromagnetic irradiation, including visible, ultraviolet, infrared, microwave, etc. Alternatively the proximity sensors can use acoustic sensing, including for example sonic, ultrasonic, etc. One concept of the present invention is to provide sensors within, adjacent or proximal to the socket-receiving compartments in the socket trays so that there is no direct contact between the proximity sensors and the sockets as the sockets are removed and replaced in compartments in the socket trays. In this regard, in addition to optical and acoustic proximity sensors, it is also within the scope of the present invention to provide proximity sensors that comprise magnet switches that are within, adjacent or proximal to the socket-receiving compartments, which magnetic switches are activated when an iron-containing or magnetic socket, driver, etc. is positioned or removed from an associated socket compartment.

The socket trays of the present invention can be used in conjunction with various conventional torque controlling systems which include control units that, upon receiving a signal that a certain socket is to be used, control the torque that will be applied by a powered tool to drive the socket to tighten a bolt, nut, or other threaded fastener.

The basic structure of the sockets trays of the present includes a plurality of socket-receiving compartments that can be provided as an integral or unitary molded or machined structure or provided as individual units that can be joined or coupled together in any convenient manner.

The socket-receiving compartments can be defined by any appropriate structure including one or more side walls that define chambers or wells into which sockets, drivers, etc. are received. The cross-sectional shape of the socket-receiving chambers can be circular, square, rectangular, triangular, or any convenient shape, so long as they are configured to receive and hold a socket, driver, etc. in a position in which the presence or absence of the socket, driver, etc. can be detected by the proximity sensors. According to one embodiment, the socket tray is an integral structure or unit that includes a plurality of socket-receiving chambers. According to other embodiments, the socket tray can comprise separate socket-receiving chambers each of which has one or more socket-receiving chambers and which separate units are configured to be coupled together to provide a socket tray having a plurality of socket-receiving chambers. The socket-receiving chambers of the socket trays can be similarly sized and configured or sized and configured differently to receive different sized sockets, drivers, etc.

A more detailed description of the present invention will be made in reference to the attached non-limiting drawings in which common reference numerals have been used to identify similar elements where possible.

FIG. 1 is a cross sectional view of a conventional socket tray in association with a torque controlling system and a tool. The socket tray 1 in FIG. 1 is coupled to a controller or computer 2 which in turn is coupled to and controls torque applied by a power tool 3. The socket tray 1 includes a plurality of socket-receiving chambers 4 which are defined by partitions or walls 5, end plates 6 and a bottom plate 7. Sockets 8 are depicted in two of the socket-receiving chambers 4. In the empty socket-receiving chambers 4 microswitches 9 having switch actuators 9 are depicted in the bottom portion of the socket-receiving chambers 4. In a typical operation, each of the socket-receiving chambers 4 has a socket 8 therein so that all of the microswitches 9 are actuated. When a socket 8 that is to be used is removed from its respective socket-receiving chamber 4, the microswitch 9 in the respective socket-receiving chamber 4 is deactivated. The signal from the microswitch that is deactivated by removal of the socket is received by the controller or computer 2 which, in response thereto, controls the amount of torque applied to the power tool 3 to which the socket is attached. When a removed socket is returned to its socket-receiving chamber the microswitch in the respective socket-receiving chamber is again activated and the controller or computer resets and waits for the signal from the next microswitch that is deactivated.

FIG. 2 is a perspective view of a single modular socket holder according to one embodiment of the present invention. The modular socket holder 11 depicted in FIG. 2 comprises a housing or block shaped structure 12 having a vertical bore 13 therein which vertical bore 13 defines a socket-receiving chamber 14. The vertical bore 13 can either include a closed bottom 15, as depicted, or can extend completely through the block shaped structure 12. One advantage to having the vertical bore 13 extend completely through the block shaped structure 12 is that when the block shaped structure 12 is removed from a support surface or holder (as discussed below), any object(s) in the socket-receiving chamber 14, such as misplaced or dropped sockets, drivers, debris, etc. can be easily removed. Such an ability to remove or retrieve objects from socket-receiving chambers 14 is not possible with conventional socket trays exemplified in FIG. 1 which would require that the socket trays be turned upside down or otherwise would require objects to be "fished out" of the socket-receiving chambers using some auxiliary tool.

The modular socket holder 11 depicted in FIG. 2 includes a proximity sensor bore 16 that extends though a side of block shaped structure 12 and intersects vertical bore 13. The proximity sensor bore 16 is configured to receive a proximity sensor 17 (FIG. 4) that is positioned to sense the presence or absence of a socket, driver, etc. in socket-receiving chamber 14 without directly contacting a socket, driver, etc. present in the socket-receiving chamber 14. Suitable proximity sensors, as discussed above, include optical proximity sensors, acoustic proximity sensors, and magnetic proximity sensors. The proximity sensor bore 16 is depicted as being substantially perpendicular to the vertical bore 13; however, it is within the scope of the present invention to provide the proximity sensor bore 16 at angles other than perpendicular to the vertical bore 13.

Figure 3:
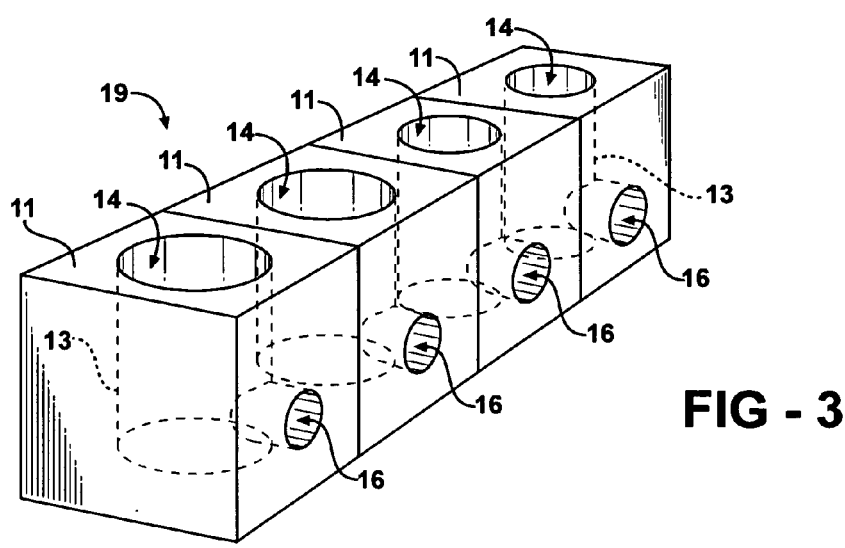
FIG. 3 is a perspective view of a socket tray according to one embodiment of the present invention.

FIG. 3 is a perspective view of a socket tray according to one embodiment of the present invention. The socket tray 19 depicted in FIG. 3 comprises a plurality of the modular socket holders 11 depicted in FIG. 2. The modular socket holders 11 can be joined or coupled together in any convenient manner. For example, the modular socket holders 11 can be fused or bonded together using any suitable means such as heat fusion techniques or chemical bonding adhesives, epoxies, etc. In addition, the side walls of the modular socket holders 11 can be provided with interlocking structures such as dovetail or T-shaped extensions/channels or similar interlocking structures that can allow the modular socket holders 11 to be coupled together by sliding them together with respect to one another vertically or horizontally or with interlocking or engaging structures that allow them to be snapped fit together. Alternatively, the modular socket holders 11 can be coupled together using various threaded members, clips, racks, rails, frames or other mechanical means and systems.

FIG. 4 is a cross sectional view of a socket holder according to one embodiment of the present invention. The socket holder 11 of FIG. 4 is depicted as having a socket 18 in socket-receiving chamber 14. The socket-receiving chamber 14 has a closed bottom 15. However, as discussed above, in alternative embodiments, the socket-receiving chambers could have open bottoms. A proximity sensor 17 is generally depicted as being held in proximity sensor bore 16. The proximity sensor 17 is positioned so as to be able to sense or detect whether or not a socket 18 is located in socket-receiving chamber 14. Any type of proximity sensor can be used which does not require contact by the socket to activate or deactivate the proximity sensor. The avoidance of such contact of the socket with the proximity sensor will prevent failure of the proximity sensor caused by repeated contact or impact by the socket which is the cause of failure in socket trays that include mechanical switches.

As discussed above, suitable proximity sensors include optical sensors that operate on reflectance or transmittance detection. When proximity sensors are used that operate on transmittance, irradiation sources such as an LEDs or other light sources can be provided in the socket holders in positions to transmit irradiation to the proximity sensors along a path that will be interrupted when a socket is placed in the socket holders. In other embodiments the proximity sensors can use any type of electromagnetic irradiation, including visible, ultraviolet, infrared, microwave, etc. Alternatively the proximity sensors can use acoustic sensing, including for example sonic, ultrasonic. In addition to optical and acoustic proximity sensors, it is also within the scope of the present invention to provide proximity sensors that comprise magnet switches that are within, adjacent or proximal to the socket-receiving compartments, which magnetic switches are activated when an iron-containing or magnetic socket, driver, etc. is positioned or removed from an associated socket-receiving compartment.

The proximity sensor 17 includes one or more electrical leads 18 which is/are coupled to a controller or computer as illustrated in FIG. 1. Each of the socket-receiving chambers in a socket tray is provided with a separate proximity sensor 17.

Figure 5:
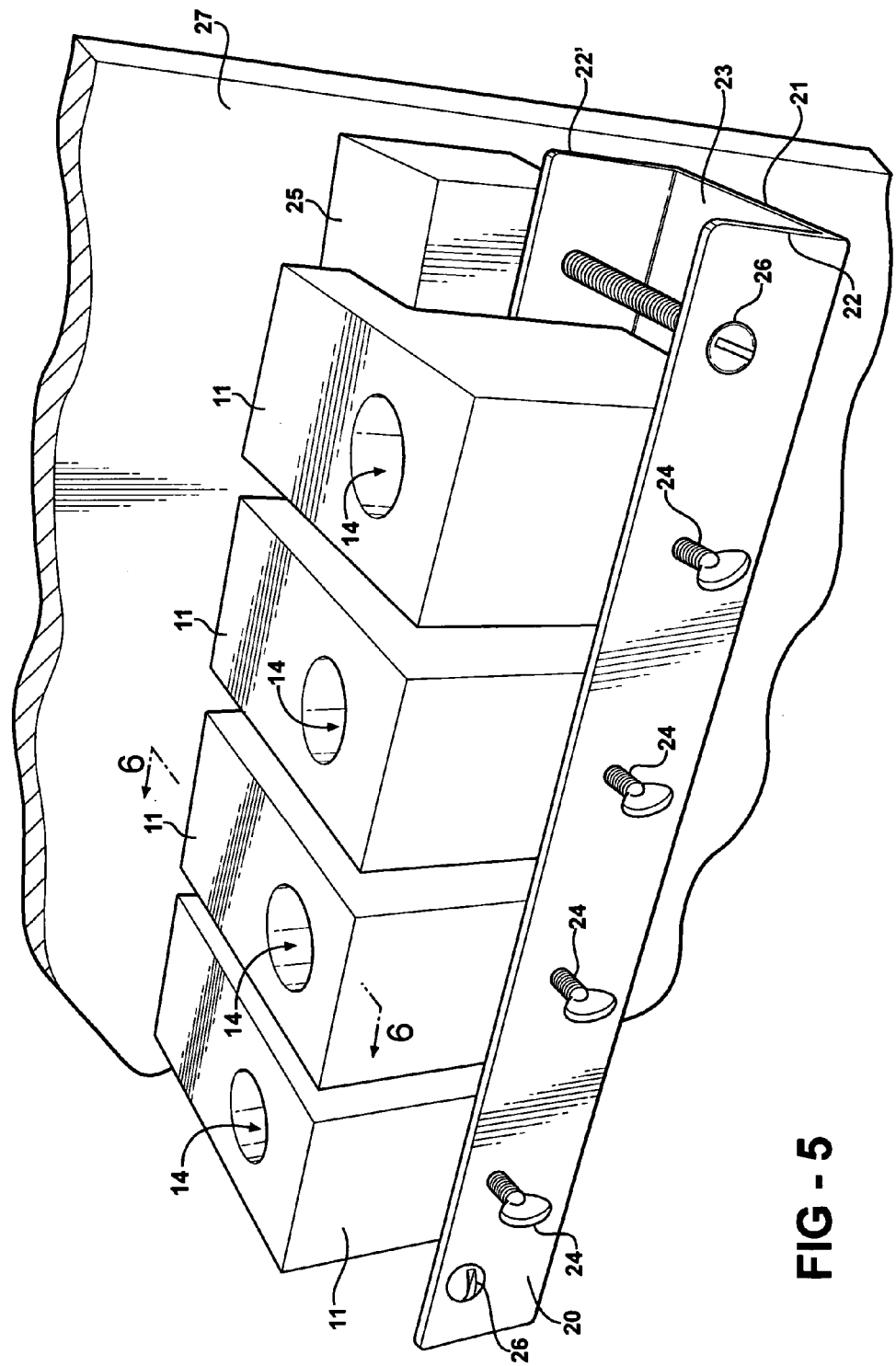
FIG. 5 is a perspective view of a socket tray according to another embodiment of the present invention.

FIG. 5 is a perspective view of a socket tray according to one embodiment of the present invention. The socket tray depicted in FIG. 5 includes a plurality of individual socket holders 11 that are received and coupled together in a frame 20. The frame 20 has a bottom 21 and opposite side walls 22, 22' that extend upward from the bottom 21 to form or define a channel 23 into which the individual socket holders 11 are received. The front side wall 22 has a plurality of threaded through-bores into which threaded members 24 are received and can be tightened to secure the individual socket holders 11 in desired locations within the frame 20. As an alternative to threaded members 24 other types of clamps can be used to secure the individual socket holders in desired locations within the frame including, for example, toggle clamps.

The frame 20 is coupled to mounting blocks 25 at either end by threaded members 26. The mounting blocks 25 allow the socket tray 19 to be mounted on a vertical support 27.

FIG. 6 is a cross sectional view of the socket tray of FIG. 5 taken along section lines 6. As shown in FIG. 6, threaded members 26 (one shown) extend through mounting blocks 25 and vertical support 27. In alternative configurations, the frame 20 could be mounted to a horizontal support surface. For example, threaded members 26 could extend downward through the bottom 21 of frame 20 and into or through a horizontal support surface.

FIG. 6 depicts the position of a proximity sensor 17 in the proximity sensor bore 16 of a socket holder 11 which has a socket 18 in its socket-receiving chamber 14. The location of the proximity sensor bore 17 is higher in the socket holder 11 depicted in FIG. 6 as compared to FIG. 4 to accommodate the back side wall 22' of frame 20. In both instances, the proximity sensor bore 16 is located so that a proximity sensor 17 therein can sense or detect the presence or absence of a socket, driver, etc. in the socket-receiving chamber 14.

The block shaped structure 12 of the socket holder 11 depicted in FIG. 6 has an extending upper portion 28 which can be provided to shield and protect the proximity sensor 17 from being contacted and damaged from objects above the socket tray 19, including sockets, drivers, etc. that are misdirected when intended to be replaced in the socket-receiving chamber, and other objects in the immediate workplace.

The socket holders of the present invention can be made from any suitable durable materials, including metals, plastic materials, polymeric materials, etc. The bores for the socket-receiving chambers and proximity sensors can be molded or machined into the block shaped structures. The block shaped structures can be circular, square, rectangular, triangular, or have any convenient shape and are not limited to the shape illustrated in the figures. In this regard, reference to "block shaped" is meant to encompass any solid shape that has the bores for the socket-receiving chambers and proximity sensors formed or provided therein. In addition to being blocked shaped, the over all structure of the socket holders can be defined by one or more walls, panels or partitions that define chambers or wells into which sockets, drivers, etc. are received. As discussed above, the cross-sectional shape of the socket-receiving chambers can be circular, square, rectangular, triangular, or any convenient shape, so long as they are configured to receive and hold a socket, driver, etc. in a position in which the presence or absence of the socket, driver, etc. can be detected by the proximity sensors.

When racks, rails, frames or similar systems are used to couple or join a plurality of the modular socket holders together, such racks, rails, frames, etc. can be made from suitable mechanically strong material, such as metals, plastic materials, polymeric materials, etc.

In addition to receiving sockets, the socket-receiving chambers can be configured to receive various drivers that are configured to tighten threaded fasteners having heads that are configured to receive the drivers. Accordingly, reference herein to the placement and removal of sockets from the socket-removing chambers applies to sockets, drivers, etc. In addition, the socket-receiving chambers can be configured to receive various machining tools such as rasps, grinding tools, etc. in which case the controller or computer can be programmed to properly adjust the torque and speed of the power tool for operation of such machining tools. It is also within the scope of the present invention to provide various sleeves and/or collars that can be used to adapt the size and/or configuration of the socket-receiving chambers to receive different shaped or sized sockets, drivers, etc.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and as set forth in the attached claims.

What is claimed is:

1. A socket tray which comprises:
   a plurality of socket-receiving chambers; and
   a plurality of proximity sensors,
   each one of the plurality of proximity sensors being associated with a separate one of the plurality of socket-receiving chambers and positioned so as to sense the presence or absence of a socket positioned within the socket-receiving chambers without being directly contacted by sockets positioned within the socket-receiving chambers.

2. A socket tray according to claim 1, wherein the plurality of proximity sensors comprise at least one of optical, acoustical or magnetic sensors.

3. A socket tray according to claim 1, wherein each of the plurality of socket-receiving chambers is defined by a bore formed in a housing and each of the plurality of proximity sensors are proved in separate bores that intercept the bores which define the socket-receiving chambers.

4. A socket tray according to claim 3, wherein each of the plurality of socket-receiving chambers is provided in a separate housing and each of the housings are coupled together.

5. A socket tray according to claim 4, wherein each of the housings are directly coupled together.

6. A socket tray according to claim 4, wherein each of the housings are coupled together by at least one of a threaded member, clip, rack, rail or frame structure.

7. A socket tray according to claim 3, wherein each of the plurality of socket-receiving chambers are provided in a common housing.

8. A socket tray according to claim 3, wherein the bores that define the socket-receiving chambers extend completely through the housing.

9. A socket tray according to claim 3, wherein the bores that define the socket-receiving chambers do not extend completely through the housing so that the socket-receiving chambers have bottoms.

10. A socket tray according to claim 4, further comprising a structure for mounting the socket tray onto at least one of a vertical or horizontal support.

11. A socket tray according to claim 7, further comprising a structure for mounting the socket tray onto at least one of a vertical or horizontal support.

12. A socket tray according to claim 1, further comprising structure that shields the plurality of proximity sensors from unintended contact.

13. A socket tray according to claim 1 in combination with a power tool and a controller for controlling torque applied by the power tool.

* * * * *